Oct. 20, 1959 P. F. SCHMIDT 2,909,470
ELECTROCHEMICAL METHOD AND SOLUTION THEREFOR
Filed Jan. 22, 1957 2 Sheets-Sheet 1

INVENTOR.
PAUL F. SCHMIDT
BY
[signature]
ATTORNEY

Oct. 20, 1959 P. F. SCHMIDT 2,909,470

ELECTROCHEMICAL METHOD AND SOLUTION THEREFOR

Filed Jan. 22, 1957 2 Sheets-Sheet 2

INVENTOR.
PAUL F. SCHMIDT

BY

ATTORNEY

United States Patent Office 2,909,470

Patented Oct. 20, 1959

2,909,470

ELECTROCHEMICAL METHOD AND SOLUTION THEREFOR

Paul F. Schmidt, Abington, Pa., assignor to Philco Corporation, Philadelphia, Pa., a corporation of Pennsylvania Application January 22, 1957, Serial No. 635,518

42 Claims. (Cl. 204—14)

Figure 1:
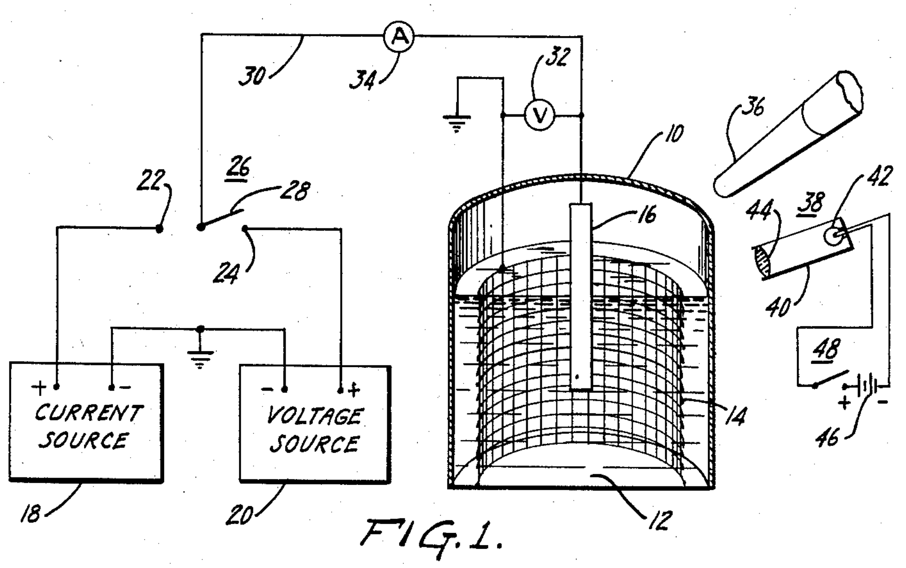

This invention relates to an electrochemical method, and to a novel electrolytic solution utilized therein, for forming oxide layers on metallic or semiconductor bodies. More particularly, the invention relates to an electrochemical method and to an anodizing solution therefor, for forming thick oxide layers on the surfaces of germanium or silicon bodies.

A problem which has long vexed fabricators of semiconductive devices has been that of preventing contamination of the surfaces of semiconductive bodies by substances present in the atmosphere impinging upon these surfaces. Such contamination is highly undesirable because it can change substantially and in an uncontrollable manner the electrical characteristics of the semiconductive material. For example, it can change undesirably the conductivity type of the surface of the semiconductive body or it may lower substantially the surface resistivity of the body. Either one of these changes frequently renders the semiconductive body unusable in semiconductive devices such as transistors and semiconductor diodes, whose efficient operation depends critically upon the semiconductor body having closely controlled electrical characteristics. Moreover, the problem of surface contamination is one of obviously substantial magnitude because of the large variety of noxious chemical agents which may be present in the atmosphere.

Heretofore, in order to protect the surfaces of semiconductive bodies from contamination by these noxious agents, it has been customary to house devices comprising such bodies in containers which are either evacuated or contain inert fluid substances, e.g. silicone greases, which envelop the semiconductive bodies and hence tend to retard atmospheric contamination of their surfaces. In utilizing either of these protective techniques, it is necessary to house the semiconductor device in hermetically-sealed containers, either to preserve the vacuum or to prevent leakage therefrom of the inert fluid substance. Clearly, a more desirable solution to the problem of preventing surface contamination is to provide for the semiconductive body a tenaciously adherent coating of a substance which is itself inert and is sufficiently thick and non-porous in structure that it retards substantially any access to the surface of the semiconductive body by noxious agents. Specifically, this type of protection for the surface of the semiconductive body is more desirable than the aforementioned prior-art techniques because it eliminates the need for either evacuating or hermetically sealing containers housing semiconductor devices, thereby making the manufacture of such devices substantially cheaper.

One form of coating whose properties are especially desirable for protecting the surfaces of semiconductive bodies from contamination is an oxide of the semiconductive material itself. However, no method appears to have been available heretofore for forming tenaciously adherent, relatively thick and substantially non-porous oxide layers without subjecting the semiconductor body to high temperatures for extended periods of time in an oxygen or ozone atmosphere. In particular, the known electrochemical oxide-forming processes have heretofore been found unsatisfactory, either because the electrolytic solution itself tends to contaminate the semiconductive body or tends to dissolve the oxide as fast as it formed, or because the process is not easily controlled or is capable of producing only thin oxide films which inadequately protect the semiconductive surface.

Accordingly it is an object of the invention to provide an improved electrochemical method for forming oxide layers on metallic or semiconductive bodies.

Another object is to provide an improved electrochemical method for forming thick oxide layers on semiconductive bodies.

An additional object is to provide an improved electrochemical method for forming tenacious oxide layers on semiconductive bodies.

A further object is to provide an improved electrochemical method for forming oxide layers on semiconductive bodies, thereby to protect these bodies from contamination by chemical agents.

Yet another object is to provide an improved electrochemical method for forming oxide layers on germanium or silicon bodies.

A still further object is to provide an improved electrochemical method for forming relatively thick oxide layers on germanium or silicon bodies.

An additional object is to provide an improved electrochemical method for forming tenacious and relatively thick oxide layers on germanium or silicon bodies.

Still another object is to provide an improved electrochemical method for rapidly forming oxide layers on germanium or silicon bodies.

An important object is to provide improved electrolytic solutions for use in electrochemically forming oxide layers on metal or semiconductive bodies.

Another important object is to provide improved electrolytic solutions whose use enables relatively thick oxide layers to be formed electrochemically upon semiconductive bodies.

A further important object is to provide improved electrolytic solutions whose use enables tenacious oxide layers to be formed electrochemically upon semiconductive bodies.

An additional substantial object is to provide improved electrolytic solutions whose use enables tenacious and relatively thick oxide layers to be formed electrochemically upon semiconductive bodies.

A specific object is to provide improved electrolytic solutions for use in electrochemically forming oxide layers on germanium or silicon bodies.

Another specific object is to provide improved electrolytic solutions whose use enables dense and thick oxide layers to be formed electrochemically upon germanium or silicon bodies.

An additional specific object is to provide improved solutions for use in electrochemically forming oxide layers on germanium or silicon bodies, in which solutions the oxide layers so formed are substantially insoluble.

Still another specific object is to provide an improved method and solutions for the rapid electrochemical formation of oxide layers on germanium or silicon bodies.

A further specific object is to provide an improved method and solution for the rapid electrochemical formation of oxide layers on germanium or silicon bodies, which layers have a tenacity and thickness sufficient to isolate effectively the surfaces of said bodies lying beneath the oxide layers from noxious contaminants present in the atmosphere surrounding said bodies.

These objects are achieved by the provision of my novel method, in the practice of which my novel solution is utilized. More particularly, in practicing my method, there is applied, to the region of a metallic or semiconductive body over which the oxide layer is to be formed, an anodizing solution comprising as a major constituent N-methyl acetamide and as a minor constituent an oxygen-containing substance which is soluble in N-methyl acetamide and which when dissolved in N-methyl acetamide, is decomposable by an electric current to make available its oxygen for forming oxide layers and in addition produces a solution in which the semiconductive body and the oxide layer formable electrolytically thereon are substantially insoluble. To energize the oxide-formation process, there is supplied to the body and to a cathode contacting the anodizing solution applied thereto, an electric current having at least at given time intervals a sense such that the body is at a potential positive with respect to that of the aforementioned cathode. For example, in one form of my method the current supplied to the body and cathode may be maintained at a constant value, while in another form of my method the current may be regulated so as to provide a constant voltage between the body and the cathode. In still another form of my method, successive alternate applications of constant currents and constant voltages may be utilized.

In a preferred form of the method of my invention, the oxide layers are formed upon a semiconductive body which may be constituted of either germanium or silicon. The anodizing solution of my invention consists of N-methyl acetamide as a major constituent, and as a minor constituent of at least one substance supplying nitrate ions to the solution, and the electric current supplied to the semiconductive body and the cathode is a direct current having a polarity such that the body is at a potential positive with respect to that of the cathode.

In another preferred form of my invention which is particularly well suited to forming oxide layers on silicon bodies, an accelerated rate of oxide formation is achieved without increasing the intensity of the applied electric current by adding to the N-methyl acetamide, nitrate-ion solution either in a small amount of water or a small amount of a substance supplying chloride or fluoride ions to the solution, or both.

By carrying out the steps of my novel method, it is practicable to produce on semiconductive bodies and metals a thick and tenacious oxide layer.

Other advantages and features of the invention will become apparent from a consideration of the following detailed description, taken in connection with the accompanying drawings, in which:

Figure 1 illustrates diagrammatically an electrochemical apparatus suitable for use in practicing the invention; and Figures 2 to 7 are graphical representations to which reference is made hereinafter in discussing the several forms of the method of my invention.

In Figure 1 apparatus suitable for practicing my novel method is depicted diagrammatically. Specifically, this apparatus includes a vessel 10 which may be made of an electrically insulating material such as glass. Vessel 10 contains an electrolytic solution 12 which, in accordance with an important feature of my invention, has one of the several novel compositions set forth in detail hereinafter. In addition, vessel 10 contains an inert electrode 14 which is immersed in solution 12 and which, in the arrangement specifically shown in the drawings, has the form of a cylinder of platinum wire screening. Furthermore, a metallic or semiconductive body 16 which is to be coated with oxide layers is, in the arrangement shown, partially immersed in solution 12 and positioned coaxial with the cylindrical inert electrode 14.

The apparatus additionally comprises adjustable sources of constant current and constant voltage 18 and 20 respectively. Since the structures of such sources are well-known to those skilled in the art, these sources are represented in the drawings by blocks. The negative terminals of sources 18 and 20 are connected to electrode 14, which serves as the cathode of my novel electrochemical method, while the positive terminals of sources 18 and 20 are respectively connected to the fixed contacts 22 and 24 of a single-pole double-throw switch 26. In addition, the movable pole 28 of switch 26 is connected to body 16 by way of a conductor 30. To measure the potential difference between body 16 and cathode 14 during the electrolytic oxidation of the surface of body 16, a voltmeter 32 is connected therebetween, while to measure the intensity of the current flowing during this anodization, an ammeter 34 is connected in series relationship with conductor 30 and body 16. Moreover, to prevent creepage of solution 12 along the unimmersed portion of body 16 during the electrolytic process, an effect which is caused by pressures exerted on the fluid particles by electrostatic forces and which is undesirable for reasons discussed more fully hereinafter, an air blower is provided whose nozzle 36 is arranged to direct a jet of air so that it impinges upon the portion of body 16 extending above the surface of solution 12. This air jet evaporates quickly the small amount of liquid which may creep above the general level of solution 12.

In addition, the apparatus includes a light source 38 comprising a cylindrical housing 40 at one end of which is an electric lamp 42 and at the other end of which is a condensing lens 44. Light source 44 is oriented so as to project through glass container 10 and the meshes of electrode 14 a beam of light which irradiates the immersed portion of body 16. Lamp 42 is energized by a source of electric current 46 which is connected to its filament by way of a switch 48. As discussed more fully hereinafter, light source 38 may be used advantageously when anodizing n-type semiconductive material.

While my novel solution and process may be used for forming oxide coatings on either metals or semiconductors, they are particularly useful for forming thick, tenacious oxide layers on semiconductors, whose controlled oxidation has heretofore been relatively difficult to achieve. Accordingly, the following specific examples of the various forms of my method are each directed to the oxide coating of a semiconductive body composed either of germanium or silicon, currently the most important semiconductors. However, it is emphasized that these examples are merely illustrative of the many applications in which my novel method is useful, and that I do not intend to limit the scope of my invention thereto.

Before oxidizing the surfaces of the semiconductive body, thereby to protect these surfaces from contamination, it is desirable to remove any surface contaminants which already may be present. This cleansing of the semiconductive surfaces may be achieved by immersing the semiconductive body briefly in an etching solution which, in one instance, may consist of one part-by-volume of concentrated nitric acid and one part-by-volume of concentrated hydrofluoric acid, or in another instance may consist of 15 parts-by-volume of glacial acetic acid, 25 parts-by-volume of nitric acid having a specific gravity of 1.42, 15 parts-by-volume of hydrofluoric acid having a concentration in water of 48 percent-by-weight and 1 part-by-volume of liquid bromine. After the semiconductive body has been etched sufficiently long to dissolve its contaminants, it is removed from the etching solution and is washed in distilled water, methyl or ethyl alcohol, or N-methyl acetamide, thereby to remove the small amount of etching solution on its surfaces, and is then dried by directing a jet of filtered air against its surfaces. In addition, the growth of a thick, tenacious oxide film on the semiconductive body is facilitated by dipping the body in a concentrated aqueous solution of hydrogen peroxide, just before electrolytically oxidizing its surfaces.

In accordance with my invention, to form a thick and tenacious oxide layer upon the surface of the semiconductive body, the body is now partially immersed, as shown in Figure 1, in an anodizing solution of novel composition which in every instance comprises as its major constitutent the solvent N-methyl acetamide and as its minor constituent an oxygen-containing substance which is soluble in this solvent, and which when dissolved therein is decomposable by an electric current to make available oxygen for forming the aforesaid oxide layers and produces a solution in which both the semiconductive body and the oxide formed thereon are insoluble. An electric current is then supplied to the semiconductive body and to inert electrode 14. This current has at given time intervals a sense such that the body is established at a potential positive with respect to electrode 14, and is maintained until an oxide of appropriate thickness has been deposited or the forming voltage has reached its ultimate value for the given solution.

To indicate more clearly the numerous forms of the method of my invention, the following detailed examples thereof are presented:

*Example 1*

Figure 2:
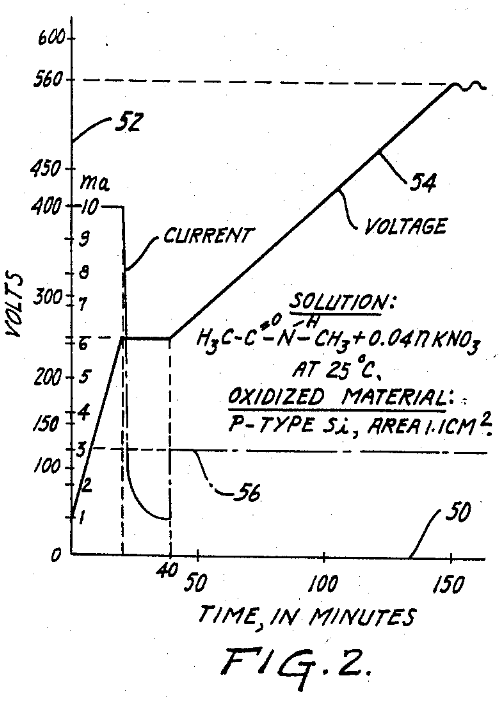
Figure 3:
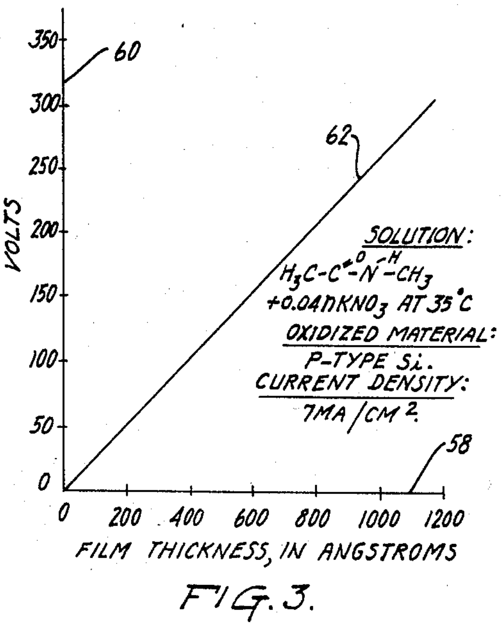

Reference is now made to Figures 1 and 2 of the drawing. In this preferred form of my novel method, body 16 is constituted of p-type silicon, while electrolytic solution 12 consists, in accordance with one aspect of my invention, of N-methyl acetamide as a major constitutent and as a minor constituent potassium nitrate. The potassium nitrate is present in a concentration such that the nitrate ion concentration is about 0.04 normal. Since potassium nitrate dissociates substantially completely in N-methyl acetamide and since the concentration of potassium nitrate is low, such as solution is prepared in practice by dissolving about 0.04 mole of potassium nitrate (i.e. substantially 4 grams) in a liter of N-methyl acetamide. For convenience, the solution is maintained at about room temperature, i.e. about 25° C. However, the exact value of the temperature is believed not to be critical.

In practicing this form of my method, switch pole 26 is connected to p-type silicon body 16 via conductor 30 and ammeter 34 and the body is partially immersed in solution 12 in the manner shown in Figure 1. The air blower is then set into operation, thereby to inhibit creepage of the electrolytic solution upward along the body. This creepage has been found to be associated with undesirable voltage breakdown phenomena observed along the unimmersed portion of body 16 during those portions of the process when relatively high voltages are applied between body 16 and cathode 14. Next a constant current is supplied to body 16 and cathode 14 by closing switch pole 28 to fixed constant 22. In this regard, reference is now made to the graphs shown at Figure 2, wherein the axis of abscissas 50 is scaled according to the time elapsing from this initial closure of switch 26, and the axis of ordinates 52 is scaled in terms of both the voltage between body 16 and electrode 14, and the current supplied to these elements, as measured respectively by voltmeter 32 and ammeter 34. Solid line 54 represents the magnitude of the voltage between body 16 and electrode 14 as a function of time, while broken line 56 represents the intensity of the current supplied to body 16 and electrode 14, as a function of time. As shown by line 56 initially a substantially constant current of 10 milliamperes is supplied to body 16 by source 18; this current corresponds to a current density of 9.1 milliamperes per square centimeter at the surface of body 16. Importantly, the sense of the current supplied by source 18 is such that body 16 is maintained at a potential positive with respect to electrode 14.

By applying this constant unidirectional current to body 16, an electrolysis of solution 12 is produced, in which the silicon body acts as the anode and electrode 14 as the cathode. It is believed that during the electrolysis, the nitrate ion is electrolytically decomposed at body 16, thereby causing oxygen ions to be released. These oxygen ions are extremely active chemically at the moment of their release and as a result, readily oxidize that portion of the surface of silicon body 16 at which they are both released. Because both silicon and its oxide are extremely insoluble in my novel solution, there is no tendency for the solution to inhibit the growth of the oxide film by dissolving it.

The longer the constant current of 10 milliamperes is supplied to the body, the thicker the oxide film becomes. Because this film has a relatively high resistivity, as the film thickens progressively higher voltages must be applied between body 16 and cathode 14 to maintain constant the current supplied thereto. In this regard the voltage between the solution and the semiconductive body on which the oxide layer is produced, i.e. the so-called forming voltage, provides a measure of the thickness of the oxide layer. Where the solution has a very low resistivity, this forming voltage is substantially equal to the potential difference between body 16 and cathode 14. However, in the present case, there is an appreciable voltage drop across the electrolytic solution because of its finite resistivity. Accordingly, to determine the forming voltage, it is necessary to subtract the voltage observed at the beginning of the electrolysis from the voltage observed at the time at which the forming voltage is to be determined.

It has been found that where the constant current of 10 milliamperes is maintained until the voltage between body 16 and electrode 14 has risen to somewhat more than 300 volts, a disruptive electrical discharge tends to occur within the oxide film thus formed. Accordingly, this voltage would appear to constitute a limit to the thickness to which the oxide may be grown in one step in the above-defined solution and on p-type silicon. However, as an important specific feature of this form of my invention, I have discovered that an oxide film having a forming voltage substantially higher than 300 volts, and hence one which is substantially thicker than that formed at 300 volts, may be produced by carrying out the following additional steps. Specifically, after the body-to-cathode voltage has risen to approximately 262 volts, an event which occurs after about 20 minutes of constant-current forming, the constant current is removed from body 16 and electrode 14 and a constant voltage of about the same magnitude, i.e. 262 volts, is applied therebetween in a polarity such that body 16 is at a potential positive with respect to that of electrode 14. This voltage is maintained for about 20 minutes, during which time the current flowing through body 16 decreases from 10 milliamperes to about one milliampere, i.e. the current density at body 16 decreases to about 0.9 milliampere per square centimeter. At this time, the constant voltage is removed, and a constant current of 3 milliamperes, corresponding to a constant current density of about 2.7 milliamperes per square centimeter, is supplied to body 16 and electrode 14 in a sense such that body 16 is established at a potential positive with respect to that of electrode 14. This constant current may be maintained until the body-to-cathode voltage has risen to about 560 volts, at which time the rise in voltage ceases and bright sparks may be observed at the surface of body 16. It is believed that the latter voltage corresponds to the maximum forming voltage for p-type silicon in the solution designated above. As an important result of my invention, this high-valued voltage corresponds to an oxide thickness which is several times greater than the thicknesses heretofore obtained on silicon by electrochemical methods. Moreover, this thick oxide is obtained within the relatively short time of 2½ hours, at a low temperature, and under easily controllable conditions.

After the oxide has been formed to the desired thickness, the constant current source is disconnected from body 16 and the body is taken out of solution 12 and is washed in a solvent in which the silicon oxide thus formed is relatively insoluble. For example, the body may be washed in pure N-methyl acetamide, ethyl alcohol or water. After its washing, the oxide-layered body is dried by a jet of clean air and may then be processed further to adapt it for its use in a semiconductor device.

*Example 2*

As aforementioned, the thickness of the oxide film formed on the semiconductor body is related to the value of the forming voltage, at least for forming voltages less than 350 volts. This fact was established in an experiment, the results of which are graphically depicted in Figure 3, in which the axis of abscissas 58 is scaled according to the thickness in angstrom units of the formed oxide film, the axis of ordinates 60 is scaled according to the forming voltage, and line 62 represents the empirically-determined relationship between the thickness and the forming voltage. More particularly, in performing this experiment, a p-type silicon body was anodized in a solution consisting of N-methyl acetamide and potassium nitrate, the latter compound being present in a normality of 0.04. This anodization was performed at a temperature of 35° C. and at a substantially constant current-density of 7 milliamperes per square centimeter. To provide a series of oxide films formed to different predetermined voltages on a single silicon body, the body was raised a predetermined distance out of the anodizing solution as each of these predetermined forming voltages was attained. After the forming voltage reached about 300 volts, the current was removed from the silicon body and the body was washed and dried as already described in Example 1. The thickness of each region of the surface was then measured by comparing the interference color of the oxide layer formed thereon with that of an optical step gauge and by dividing the thickness indicated by the optical gauge by the value of the approximate refractive index of the oxide (i.e. 1.55). Line 62 of Figure 2 indicates the result of this experiment, i.e. that the film thickness varies substantially linearly with forming voltage, the ratio of oxide thickness to forming voltage being, in this instance, about 3.8 angstrom units per forming volt.

*Example 3*

Thus far, the detailed discussion of my novel method has been confined to the formation, in my novel n-methyl acetamide-potassium nitrate solution, of p-type silicon. However, my novel method is by no means limited merely to forming either silicon bodies or p-type semiconductors but may be used to form metals or other semiconductors regardless of whether they are p or n in type. For example, substantial oxide layers may also be formed on n-type germanium bodies by practicing my novel method. In this regard, reference is now made to Figure 4, which depicts graphically the forming characteristics of n-type germanium. In this figure, the axis of abscissas 64 represents the length of the time interval during which the electric current is applied, the axis of ordinates 66 represents the potential difference between the germanium body and cathode 14, and line 68 represents the observed relationship between this voltage and the forming time.

In performing this form of my method, the n-type germanium body is first cleansed and is then partially immersed, in the manner depicted in Figure 1 and discussed above, in a solution of N-methyl acetamide and 0.04 normal potassium nitrate. Next, switch 48 is closed, thereby causing the n-type germanium body to be illuminated by lamp 42. This illumination acts to induce the generation of minority-carriers, i.e. holes, in the semiconductive body and upon its surface, a condition which facilitates the oxidative process by preventing the formation during electrolysis of a back-biased rectifying barrier at the body-liquid interface.

By closing switch pole 28 to contact 22, a constant current is then supplied to the n-type germanium body and to electrode 14, having an intensity such that a current density of about 1.3 milliamperes per square centimeter is established at the surface of the germanium body, and a sense such that the body is at a potential positive with respect to electrode 14. This constant current is maintained until the forming voltage attains a value of about 70 volts, at which time the germanium body is disconnected from constant-current source 18 and is washed in pure N-methyl acetamide.

Because the amorphous and tetragonal forms of germanium dioxide, which are formed by my novel method, are soluble in water, it is not feasible to electroform these oxides to any substantial thickness and with any degree of tenacity in an aqueous electrolyte. However, by utilizing my novel method which, as an essential feature, includes the step of forming in the non-aqueous solvent N-methyl acetamide, it is entirely practicable to form relatively thick and tenaciously bound oxides on germanium bodies.

*Example 4*

Figure 5:
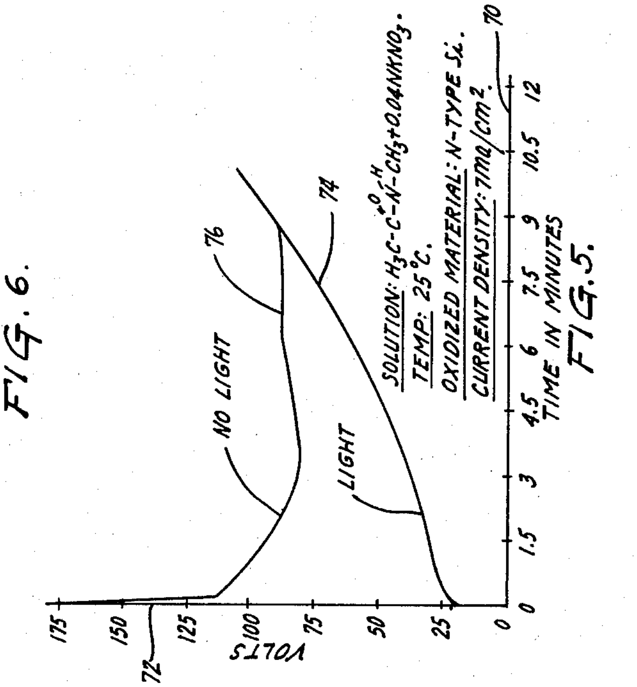

Similarly, it is feasible to form n-type as well as p-type silicon bodies in an N-methyl acetamide, potassium nitrate electrolyte. In this regard, Figure 5 shows forming characteristics for an n-type silicon body, both in the presence and absence of light. As in Figure 4, the axis of abscissas 70 represents the time during which the forming current is applied, while the axis of ordinates 72 represents the voltage between the semiconductive body 16 and cathode 14. In addition, line 74 represents the relationship between the body-to-cathode voltage and the time of forming for an n-type silicon body irradiated with light, while line 76 represents this relationship for an n-type body formed in darkness. Since the manipulative steps are similar to those already described in the copending examples, they will not be described in detail at this point. In the present example, the n-type silicon body is formed in a solution identical to that used in the preceding examples, i.e. N-methyl acetamide containing potassium nitrate at a normality of 0.04. The forming is carried out at a constant current density of about 7 milliamperes per square centimeter, and at a temperature of 25° C.

Figure 4:
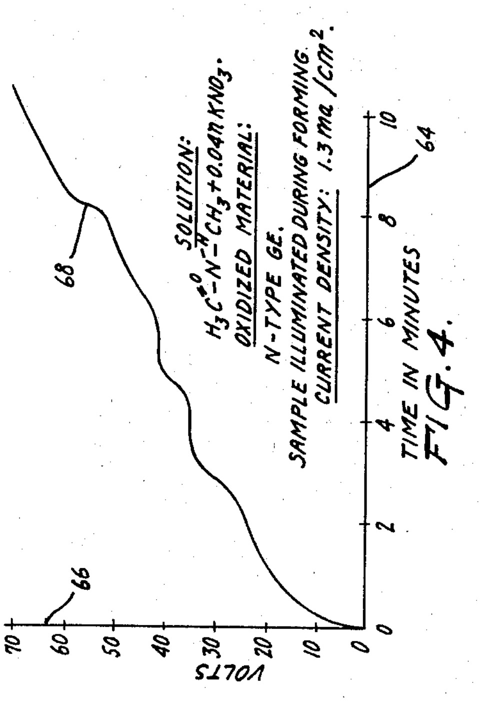
Figure 7:
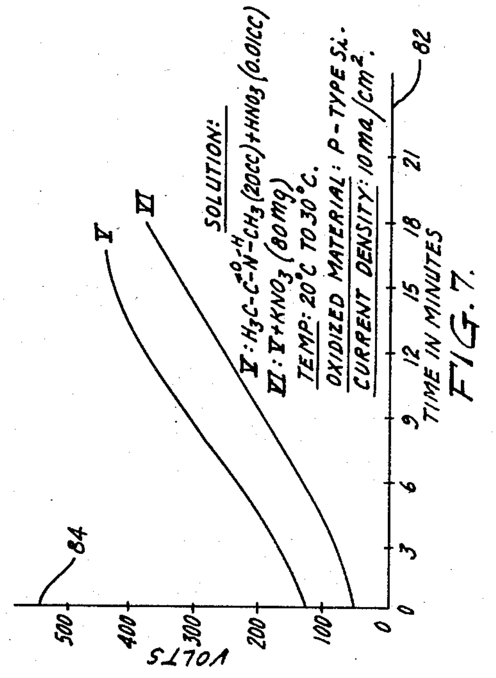

As indicated by line 74 of Figure 5, where the n-type silicon body is illuminated during forming, it has a forming characteristic which is generally similar to curve 68 of Figure 4, depicting the forming characteristic for an illuminated n-type germanium body. Markedly differing from the latter two characteristics is the characteristic depicted in Figure 6 by line 76, for the formation of n-type silicon in the absence of light. In the latter case, because of the existence of a back-biased rectifying barrier between the electrolyte and the n-type semiconductive body, the voltage between the body and the cathode is initially very high, e.g. of the order of 200 volts at a current density of 7 milliamperes per square centimeter. Although this voltage falls rapidly, its minimum value, which occurs after about three minutes of forming, is about 80 volts. Thereafter, the voltage begins to rise once more. After about nine minutes of forming, the two forming curves 74 and 76 coincide, indicating that the oxide layers have attained a thickness at which the forming process is no longer substantially responsive to light.

As discussed hereinbefore, where the n-type semiconductor is formed under illumination this rectifying barrier between the semiconductor and the electrolytic solution is dissipated by holes generated in the semiconductive body and its surface in response to the light incident thereon. Accordingly, the initially high potential difference between the semiconductive body and the cathode electrode is not developed in this case. However, regardless of whether illumination is employed, where a constant current is supplied to the body and cathode electrode, oxide films of substantial thickness are developed on the surfaces of the body. In fact, because of the somewhat higher temperatures which prevail at the surfaces of n-type semiconductive bodies during the forming process when such bodies are formed in darkness, the films formed at a given voltage on the unilluminated bodies tend to be somewhat thicker than those formed on illuminated bodies. These higher temperatures are produced by the heat generated in forcing the constant forming current through the back-biased rectifying barrier. However, despite the slightly thicker oxide produced in the absence of light, forming n-type bodies under illumination is preferable because of the greater ease with which the body temperature and current can be controlled therein.

*Example 5*

Figure 6:
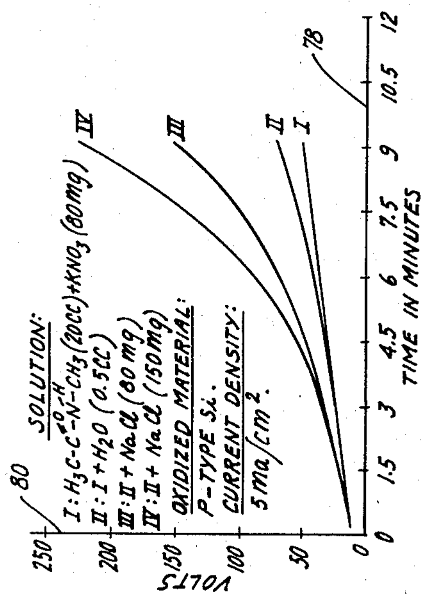

In the preceding four examples, the novel electrolytic solution utilized in each instance has been one consisting of N-methyl acetamide and potassium nitrate, the potassium nitrate being present therein in a concentration substantially equal to 4 grams of potassium nitrate per liter of N-methyl acetamide. However, this solution is by no means the only N-methyl acetamide solution which can be used to form semiconductive bodies. In fact, it has been found that, by adding small amounts of other substances to the foregoing solution, it is possible to increase substantially the rate at which the oxide layer is formed upon a semiconductive body. In this regard, reference is now made to Figure 6 of the drawing, in which the axis of abscissas 78 represents forming time in minutes, while the axis of ordinates 80 represents the body-to-cathode voltage measured by voltmeter 32. In addition, four forming characteristics are depicted in Figure 6, each indicating the relationship between the body-to-cathode voltage and the forming time, for a particular forming solution, when a p-type silicon body is formed at a constant current density of 5 milliamperes per square centimeter and at a temperature of 25° C. The forming characteristics are designated respectively by the Roman numerals I, II, III and IV, which are used also to designate the composition of the forming solution used in obtaining the curve. In this regard, curve I, which is the forming characteristic when the solution of Examples 1 to 4 is utilized, is shown so that the substantial acceleration in the rate of formation achieved by solutions II to IV may be better appreciated.

More particularly, the solution used in obtaining curve II contains 4 grams of potassium nitrate per liter of N-methyl acetamide, as does the solution of curve I, and in addition contains 25 cubic centimeters of water per liter of N-methyl acetamide. As shown by curve II, the forming rate in this solution of p-type silicon is slightly increased over that obtained by using the solution consisting solely of N-methyl acetamide and potassium nitrate.

Much more substantial increases in the forming rate are obtained when, in addition to water, a substance containing chloride ions is also dissolved into the N-methyl acetamide, potassium nitrate solution. In this regard, reference is now made to curves III and IV of Figure 6. The forming characteristics shown by curve III is obtained by utilizing a solution consisting of 4 grams of potassium nitrate, 25 cubic centimeters of water, and 4 grams of sodium chloride, per liter of N-methyl acetamide, while the forming characteristic of curve IV is obtained by increasing the amount of sodium chloride concentration in the solution of curve III to 7.5 grams per liter of N-methyl acetamide. It is seen from Figure 6 that the solution having the highest concentration of chloride ion has the highest forming rate.

*Example 6*

Increases in the forming rate of silicon which exceed even the substantial increases attained by adding chloride ions and water to the N-methyl acetamide, potassium nitrate solution, may be achieved by adding fluoride ions to the latter solution. In a specific case, this form of my novel solution consists of N-methyl acetamide as a major constituent and, as minor constituents, potassium nitrate and ammonium fluoride. The potassium nitrate is present in a concentration of substantially 4 grams per liter of N-methyl acetamide, while the ammonium fluoride is present in a concentration of 0.5 gram per liter of N-methyl acetamide.

To oxidize the surface of a body composed of p-type silicon the surfaces of the body are first cleansed in one of the etchants discussed above, and the body is then arranged in the above-defined fluoride solution in the manner depicted in Figure 1. This solution is at a temperature of 27° C. A constant current is then supplied by source 18 to the silicon body and to cathode 14, in an intensity such that the current density at the surface of the body lies between 8.8 and 9.4 milliamperes per square centimeter. This current is maintained for about three minutes, at which time the potential difference between the silicon body and cathode 14 has risen to 420 volts. Current source 18 is then disconnected from the body, and the body is removed from the electrolytic solution, washed in water, ethyl alcohol or N-methyl acetamide, and dried by an air jet. The oxide thus formed in three minutes is found to be thick, tenacious and substantially non-porous.

*Example 7*

In each of the foregoing examples the source of the oxygen necessary for oxide formation on the semiconductive body has been the nitrate ion of potassium nitrate. However, as discussed more fully below, the anion supplying the oxygen need not be the nitrate ion. Moreover, where the nitrate ion is utilized as the oxygen-supplier, it need not be provided specifically by potassium nitrate but may be supplied by a variety of other nitrate compounds, e.g. the alkali-metal nitrates or nitric acid. In addition, a plurality of nitrate compounds may be dissolved in the N-methyl acetamide to provide nitrate ions. In this regard, reference is now made to Figure 7, in which the axis of abscissas 82 represents the forming time in minutes, while the axis of ordinates 84 represents the body-to-cathode voltage measured by voltmeter 32. Two forming characteristics, designated respectively by the Roman numerals V and VI, are shown in this figure. Each depicts the relationship between body-to-cathode voltage and forming time, for a particular forming solution, when a p-type silicon body is formed at a constant current density of 10 milliamperes per square centimeter, at a temperature between 25° C. and 30° C. More specifically, curve V is obtained in the course of anodizing the silicon body in a solution consisting of approximately 0.5 cubic centimeter of concentrated nitric acid per liter of N-methyl acetamide, while curve VI is obtained in the course of anodizing the body in a solution containing the aforementioned compounds and in addition, 4 grams of potassium nitrate per liter of N-methyl acetamide. With regard to curve V, it will be noted that, even at the beginning of the electrolytic process, the body-to-cathode voltage has the relatively high value of 130 volts. This initial high voltage exists because the solution consisting only of N-methyl acetamide and nitric acid has a relatively high resistivity and there is therefore a substantial voltage drop across the solution.

Curve VI shows, by its lower initial body-to-cathode voltage, that by adding potassium nitrate to the N-methyl acetamide-nitric acid solution, the resistivity of this solution is reduced substantially and a somewhat higher forming voltage is attained. Either form of my novel solution may be used to produce a relatively thick and tenacious oxide film on the silicon body.

The foregoing examples illustrate a few of the many possible forms of the electrolytic solution of my invention, and of my novel method in which this solution is utilized to produce oxide layers on semiconductive bodies. In each example, the anion which, upon electrical decomposition, provides the oxygen necessary to form oxide layers on the semiconductive body has been the nitrate ion. However, as aforementioned, it is by no means necessary that this ion be the oxygen source. In fact any oxygen-containing substance which is soluble in N-methyl acetamide, and which when dissolved therein is decomposable by the electric current to release oxygen and produces a solution in which the body and its oxide are insoluble, may be used as the oxygen-supplying material. Examples of such substances include ammonium and aluminum sulfate, phosphorus pentoxide, acetic anhydride and hydrogen peroxide.

Moreover, in those solutions comprising N-methyl acetamide and potassium nitrate, the concentration of the potassium nitrate need not necessarily be 4 grams per liter of N-methyl acetamide but may in fact be in the range of 0.5 gram to 4 grams of this solvent.

Furthermore, although all of the specific examples have been directed to the forming of oxide layers on germanium and silicon bodies, a result which my method is especially well adapted to produce, it is to be understood that my novel method is also adapted to form oxide layers on other semiconductive materials as well as upon metal bodies, e.g. tantalum. Thus my method may be used in producing electrolytic capacitors.

In addition, while in each of my specific examples, the oxide formation is energized by supplying a substantially constant, unidirectional voltage or current to the body to be oxidized and to the cathode, it is also feasible to produce these oxide layers by utilizing a pulsating or alternating current or voltage. The essential requirement regarding the electric current supplied to the body and cathode is that it have, at given time intervals, a sense such that the body is established at a potential positive with respect to that of the cathode.

While I have described my invention by means of specific examples and in specific embodiments, I do not wish to be limited thereto, for obvious modifications will occur to those skilled in the art without departing from the scope of my invention.

What I claim is:

1. A solution for the electrolytic production of oxide layers upon metallic or semiconductive bodies, said solution consisting essentially of N-methyl acetamide as a major constituent and as a minor constituent a substance selected from the group consisting of ammonium sulfate, aluminum sulfate, a compound supplying nitrate ions to said solution, hydrogen peroxide, phosphorus pentoxide and acetic anhydride.

2. The method of forming oxide layers on metallic or semiconductive bodies, comprising the steps of: applying to a surface of said body a solution consisting essentially of N-methyl acetamide as a major constituent and as a minor constituent a substance selected from the group consisting of ammonium sulfate, aluminum sulfate, a compound supplying nitrate ions to said solution, hydrogen peroxide, phosphorus pentoxide and acetic anhydride; and supplying to said body an electric current having at given time intervals a sense such that said body is established at a potential positive with respect to that of a cathode contacting said solution.

3. A solution for the electrolytic production of oxide layers upon semiconductive bodies, said solution consisting of N-methyl acetamide as a major constituent and as a minor constituent a substance supplying nitrate ions to said solution.

4. A solution for the electrolytic production of oxide layers upon metallic bodies and semiconductive bodies, said solution consisting of N-methyl acetamide and a solute consisting of at least one substance supplying nitrate ions to said solution.

5. A solution for the electrolytic production of oxide layers upon semiconductive bodies, said solution consisting of N-methyl acetamide and a solute consisting of a plurality of substances each supplying nitrate ions to said solution.

6. A solution for the electrolytic production of oxide layers upon germanium or silicon bodies, said solution consisting essentially of N-methyl acetamide as a major constituent and as a minor constituent an alkali-metal nitrate.

7. A solution for the electrolytic production of oxide layers upon germanium or silicon bodies, said solution consisting of N-methyl acetamide as a major constituent and as minor constituents potassium nitrate and nitric acid.

8. A solution for the electrolytic production of oxide layers upon silicon bodies, said solution consisting of N-methyl acetamide as a major constituent and as minor constituents potassium nitrate and water.

9. A solution for the electrolytic production of oxide layers upon silicon bodies, said solution consisting of N-methyl acetamide as a major constituent and as minor constituents water and substances supplying nitrate and chloride ions to said solution.

10. A solution for the electrolytic production of oxide layers upon silicon bodies, said solution consisting of N-methyl acetamide as a major constituent and as minor constituents water, potassium nitrate and sodium chloride.

11. A solution for the electrolytic production of oxide layers upon germanium or silicon bodies, said solution consisting of N-methyl acetamide and potassium nitrate, said potassium nitrate being present in said solution in a concentration lying in the range of 0.5 gram to 4 grams inclusive per liter of said N-methyl acetamide.

12. A solution for the electrolytic production of oxide layers upon germanium or silicon bodies, said solution consisting of N-methyl acetamide and potassium nitrate, said potassium nitrate being present in a concentration substantially equal to four grams per liter of said N-methyl acetamide.

13. A solution for the electrolytic production of oxide layers upon germanium or silicon bodies, said solution consisting of N-methyl acetamide and concentrated nitric acid, said nitric acid being present in a concentration lying in the range of 0.5 cubic centimeter to 25 cubic centimeters inclusive per liter of said N-methyl acetamide.

14. A solution for the electrolytic production of oxide layers upon germanium or silicon bodies, said solution consisting of N-methyl acetamide and concentrated nitric acid, said nitric acid being present in a concentration substantially equal to 0.5 cubic centimeter per liter of said solution.

15. A solution for the electrolytic production of oxide layers upon germanium or silicon bodies, said solution consisting of N-methyl acetamide, concentrated nitric acid and potassium nitrate, said potassium nitrate being present in said solution in a concentration substantially equal to 4 grams per liter of said N-methyl acetamide and said nitric acid being present in said solution in a concentration lying in the range of 0.5 cubic centimeter to 25 cubic centimeters per liter of said N-methyl acetamide.

16. A solution for the electrolytic production of oxide layers upon germanium or silicon bodies, said solution consisting of N-methyl acetamide, potassium nitrate and concentrated nitric acid, said potassium nitrate and nitric acid being present in said solution in the respective concentrations of substantially 4 grams and 0.5 cubic centimeter, per liter of said N-methyl acetamide.

17. A solution for the electrolytic production of oxide layers upon silicon bodies, said solution consisting of N-methyl acetamide, potassium nitrate and water, said potassium nitrate being present in said solution in a concentration of substantially 4 grams per liter of said N-methyl acetamide, and said water being present in said solution in a concentration lying in the range of 25 to 100 cubic centimeters inclusive per liter of said N-methyl acetamide.

18. A solution for the electrolytic production of oxide layers upon silicon bodies, said solution consisting of N-methyl acetamide, potassium nitrate and water, said potassium nitrate and water being present in said solution in the respective concentrations of substantially 4 grams and 25 cubic centimeters per liter of said N-methyl acetamide.

19. A solution for the electrolytic production of oxide layers upon silicon bodies, said solution consisting of N-methyl acetamide, potassium nitrate, sodium chloride and water, said potassium nitrate being present in said solution in the respective concentrations of substantially 4 grams and 25 cubic centimeters per liter of said N-methyl acetamide, and said sodium chloride being present in said solution in a concentration lying in the range of zero to 7.5 grams inclusive, per liter of said N-methyl acetamide.

20. A solution for the electrolytic production of oxide layers upon silicon bodies, said solution consisting of N-methyl acetamide, potassium nitrate and ammonium fluoride, said potassium nitrate and ammonium fluoride being present in said solution in the respective concentrations of substantially 4 grams and 0.5 gram per liter of said N-methyl acetamide.

21. The method of forming oxide layers on metallic or semiconductive bodies, comprising the steps of: applying to a surface of said body a solution consisting essentially of N-methyl acetamide as a major constituent and as a minor constituent a substance supplying nitrate ions to said solution; and supplying to said body an electric current having, at given time intervals, a sense such that said body is established at a potential positive with respect to that of a cathode contacting said solution.

22. The method of forming oxide layers on semiconductive bodies, comprising the steps of: applying to a surface of said body a solution consisting essentially of N-methyl acetamide as a major constituent and as a minor constituent a substance supplying nitrate ions to said solution; and supplying to said body a unidirectional electric current having a substantially constant value and a sense such that said body is poled positively with respect to an inert electrode contacting said solution and supplied with said current.

23. The method of forming oxide layers on semiconductive bodies, comprising the steps of: applying to a surface of said body a solution consisting essentially of N-methyl acetamide as a major constituent and as a minor constituent a substance supplying nitrate ions to said solution; contacting said solution with an electrode composed of an inert material; and applying between said body and said electrode a substantially constant unidirectional voltage poled so that the potential of said body is positive with respect to that of said electrode.

24. The method of forming oxide layers on semiconductive bodies, comprising the steps of: immersing a portion of said body in a solution consisting essentially of N-methyl acetamide as a major constituent and as a minor constituent a substance supplying nitrate ions to said solution; immersing in said solution in spaced relationship to said body an electrode composed of an inert material; supplying to said body and said electrode a unidirectional current having a substantially constant first value and a sense such that said body is at a potential positive with respect to that of said electrode; maintaining said current until the potential difference between said body and electrode increases to a predetermined value; applying between said body and said electrode a unidirectional voltage having substantially said predetermined value and poled so that said body is at a potential positive with respect to said electrode; and maintaining said unidirectional voltage until the current produced thereby decreases to a predetermined intensity.

25. A method according to claim 24, said method including the additional steps of: supplying, subsequent to said step of maintaining said unidirectional voltage, a second unidirectional current having a substantially constant second value and said sense; and maintaining said second current until the voltage between said body and said electrode increases to a second predetermined value.

26. The method of forming oxide layers on silicon or germanium bodies, comprising the steps of: immersing a portion of said body in a solution consisting of N-methyl acetamide as a major constituent and as a minor constituent a substance supplying nitrate ions to said solution; and supplying a unidirectional electric current to said body and to an inert electrode immersed in said solution, said current having a sense such that said body is at a potential positive with respect to that of said electrode.

27. The method of forming oxide layers on silicon or germanium bodies, comprising the steps of: immersing a portion of said body in a solution consisting of N-methyl acetamide as a major constituent and as a minor constituent, at least one substance supplying nitrate ions to said solution; and supplying a unidirectional electric current to said body and to an inert electrode immersed in said solution, said current having a sense such that said body is at a potential positive with respect to that of said electrode.

28. The method of forming oxide layers on silicon or germanium bodies, comprising the steps of: immersing a portion of said body in a solution consisting of N-methyl acetamide as a major constituent and nitric acid as a minor constituent; and supplying a unidirectional electric current to said body and to an inert electrode immersed in said solution, said current having a sense such that said body is at a potential positive with respect to that of said electrode.

29. The method of forming oxide layers on silicon or germanium bodies, comprising the steps of: immersing a portion of said body in a solution consisting of N-methyl acetamide as a major constituent and a nitrate salt and nitric acid as minor constituents; and supplying a unidirectional electric current to said body and to an inert electrode immersed in said solution, said current having a sense such that said body is at a potential positive with respect to that of said electrode.

30. The method of claim 29, wherein said step of immersing said portion of said body in said solution includes the step of immersing said portion in a solution consisting of N-methyl acetamide as a major constituent and potassium nitrate and nitric acid as minor constituents.

31. The method of forming oxide layers on silicon or germanium bodies, comprising the steps of: immersing a portion of said body in a solution consisting of N-methyl acetamide as a major constituent, and, as minor constituents, substances supplying respectively nitrate ions and chloride ions; and supplying a unidirectional electric current to said body and to an inert electrode immersed in said solution, said current having a sense such that said body is at a potential positive with respect to that of said electrode.

32. The method of forming oxide layers on silicon bodies, comprising the steps of: immersing a portion of said body in a solution consisting of N-methyl acetamide as a major constituent and, as minor constituents, potassium nitrate and water; and supplying a unidirectional electric current to said body and to an inert electrode immersed in said solution, said current having a sense such that said body is at a potential positive with respect to that of said electrode.

33. The method of forming oxide layers on silicon bodies, comprising the steps of: immersing a portion of said body in a solution consisting of N-methyl acetamide as a major constituent and, as minor constituents, potassium nitrate, sodium chloride and water; and supplying a unidirectional electric current to said body and to an inert electrode immersed in said solution, said current having a sense such that said body is at a potential positive with respect to that of said electrode.

34. The method of forming oxide layers on silicon or germanium bodies, comprising the steps of: immersing a portion of said body in a solution consisting of N-methyl acetamide as a major constituent and potassium nitrate as a minor constituent; and supplying a unidirectional electric current to said body and to an inert electrode immersed in said solution, said current having a sense such that said body is at a potential positive with respect to that of said electrode.

35. The method of forming oxide layers on silicon or germanium bodies, comprising the steps of: immersing a portion of said body in a solution consisting of N-methyl acetamide and potasisum nitrate, said potassium nitrate being present in said solution in a concentration lying in the range of 0.5 gram to 4 grams inclusive per liter of said N-methyl acetamide; and supplying a unidirectional electric current to said body and to an inert electrode immersed in said solution, said current having a sense such that said body is at a potential positive with respect to that of said electrode.

36. The method of forming oxide layers on p-type silicon bodies, comprising the steps of: immersing a portion of said body in a solution consisting of N-methyl acetamide and potassium nitrate, said potassium nitrate being present in said solution in a concentration substantially equal to 4 grams of potassium nitrate per liter of said N-methyl acetamide; supplying to said body and to an inert electrode immersed in said solution a unidirectional electric current having substantially constant value such that the average current density at the surface of said body is approximately equal to 9.1 milliamperes per square centimeter and a sense such that said body is at a potential positive with respect to said electrode; and maintaining said current until the potential difference between said body and said electrode is approximately 262 volts; applying between said body and said electrode a unidirectional voltage having a value substantially equal to 262 volts and a polarity such that said body is at a potential positive with respect to that of said electrode and maintaining said voltage until said average current density at said surface of said body has attained a value approximately equal to 0.9 milliampere per square centimeter; subsequently supplying to said body and said electrode a unidirectional electric current having said sense and a value such that said average current density at said body surface is approximately 2.7 milliamperes per square centimeter; and maintaining said last-named electric current until said potential difference between said body and said electrode attains a predetermined value of the order of 560 volts.

37. The method of forming oxide layers on n-type silicon or germanium bodies, comprising the steps of: immersing a portion of said body in a solution consisting of N-methyl acetamide and potassium nitrate, said potassium nitrate being present in said solution in a concentration substantially equal to 4 grams of potassium nitrate per liter of said N-methyl acetamide; irradiating said immersed portion of said body with electromagnetic waves having wavelengths within the visible spectrum; supplying to said body and to an inert electrode immersed in said solution a unidirectional electric current having a value producing at the surface of said body a substantially constant current density of predetermined value and a sense such that said body is at a potential positive with respect to that of said electrode; and maintaining said current until the potential difference between said body and electrode has attained a given value.

38. The method of forming oxide layers on a body of n-type germanium, comprising the steps of: immersing a portion of said body in a solution consisting of N-methyl acetamide and potassium nitrate, said potassium nitrate being present in said solution in a concentration substantially equal to 4 grams of potassium nitrate per liter of said N-methyl acetamide; irradiating said immersed portion of said body with electromagnetic waves having wavelengths within the visible spectrum; supplying to said body and to an inert electrode immersed in said solution a unidirectional electric current having a value producing at the surface of said body a current density substantially equal to 1.3 milliamperes per square centimeter and a sense such that said body is at a potential positive with respect to that of said electrode; and maintaining said current until the potential difference between said body and electrode has attained a value of approximately 70 volts.

39. The method of forming oxide layers on a body of n-type silicon, comprising the steps of: immersing a portion of said body in a solution consisting of N-methyl acetamide and potassium nitrate, said potassium nitrate being present in said solution in a concentration substantially equal to 4 grams of potassium nitrate per liter of said N-methyl acetamide; irradiating said immersed portion of said body with electromagnetic waves having wavelengths within the visible spectrum; supplying to said body and to an inert electrode immersed in said solution a unidirectional electric current having a value producing at the surface of said body a current density substantially equal to 7 milliamperes per square centimeter and a sense such that said body is at a potential positive with respect to that of said electrode; and maintaining said current density until the potential difference between said body and electrode has attained a value of approximately 110 volts.

40. The method of forming oxide layers on a body of p-type silicon, comprising the steps of: immersing a portion of said body in a solution consisting of N-methyl acetamide, concentrated nitric acid and potassium nitrate, said nitric acid being present in said solution in a concentration substantially equal to 0.5 cubic centimeter of nitric acid per liter of said N-methyl acetamide and said potassium nitrate being present in said solution in a concentration lying in the range of zero to 4 grams of potassium nitrate per liter of said N-methyl acetamide; supplying to said body and to an inert electrode immersed in said solution a unidirectional electric current having a value producing at the surface of said body a current density having a value substantially equal to 10 milliamperes per square centimeter and a sense such that said body is at a potential positive with respect to that of said electrode; and maintaining said current until the potential difference between said body and electrode is approximately 400 volts.

41. The method of forming oxide layers on a body of p-type silicon, comprising the steps of: immersing a portion of said body in a solution consisting of N-methyl acetamide, potassium nitrate, sodium chloride and water, said potassium nitrate being present in said solution in a concentration substantially equal to 4 grams per liter of said N-methyl acetamide, said sodium chloride being present in said solution in a concentration falling within the range of zero to 0.75 gram per liter of said N-methyl acetamide and said water being present in said solution in a concentration substantially equal to 25 cubic centimeters per liter of said N-methyl acetamide; and supplying to said body and to an inert electrode also immersed in said solution a unidirectional electric current having an intensity producing a current density at the surface of said body substantially equal to 5 milliamperes per square centimeter and a sense such that said body is at a potential positive with respect to that of said electrode.

42. The method of forming oxide layers on bodies of p-type silicon, comprising the steps of: immersing a portion of said body in a solution consisting of N-methyl acetamide, potassium nitrate and ammonium fluoride, said potassium nitrate and ammonium fluoride being present in said solution in the respective concentrations of substantially 4 grams and 0.5 gram per liter of said N-methyl acetamide; and supplying to said body and to an inert electrode also immersed in said solution a unidirectional electric current having an intensity producing a current density, at the surface of said body, lying in the range of 8.8 to 9.4 milliamperes per square centimeter and having a sense such that said body is at a potential positive with respect to that of said electrode.

References Cited in the file of this patent

"Zeitschrift für Elektrochemie," vol. 39 (1933), pages 731–735; article by Schupp.